Oct. 25, 1949.　　　　O. H. BANKER　　　2,485,688
AXIALLY ENGAGING MULTIPLE FLUID CLUTCH
Filed Dec. 26, 1944　　　　　　　　　　　　6 Sheets-Sheet 3

INVENTOR.
Oscar H. Banker,
BY
Cromwell, Greist & Warden
Attys

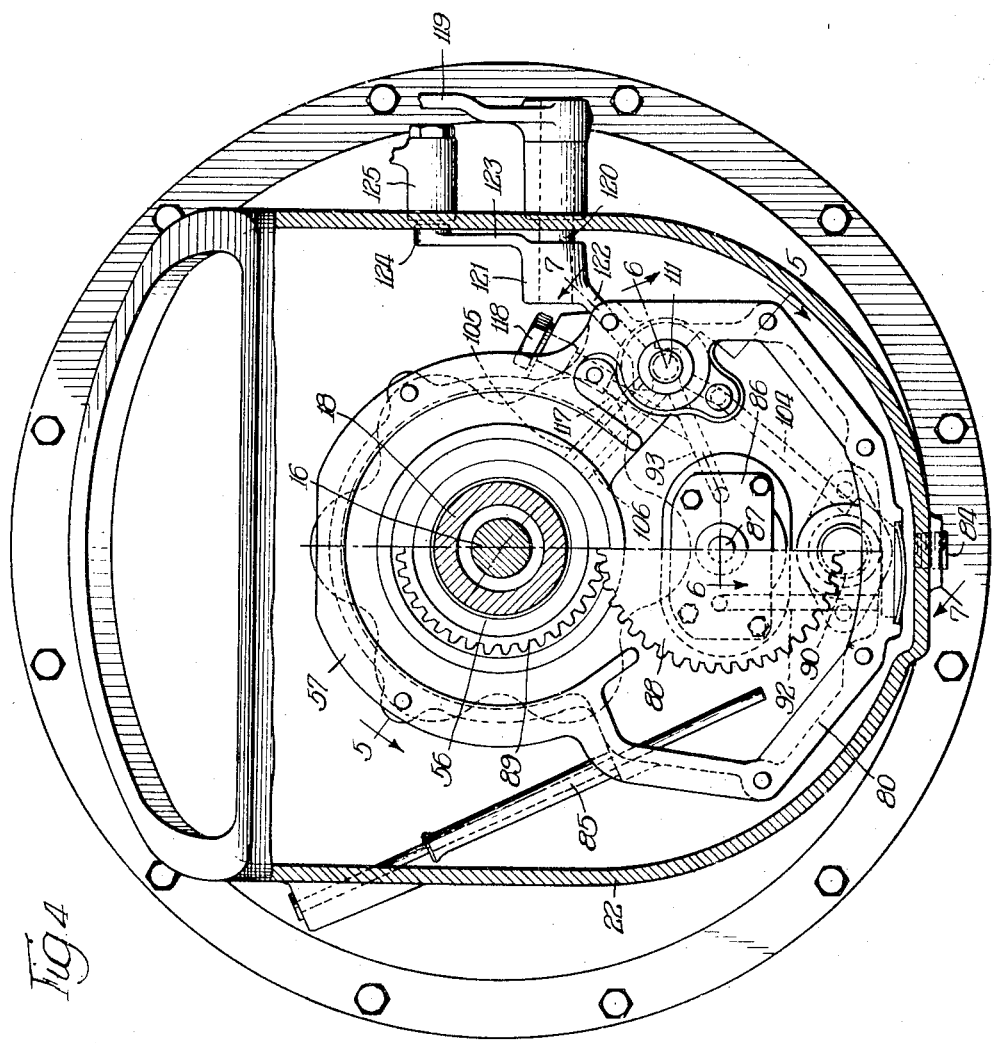

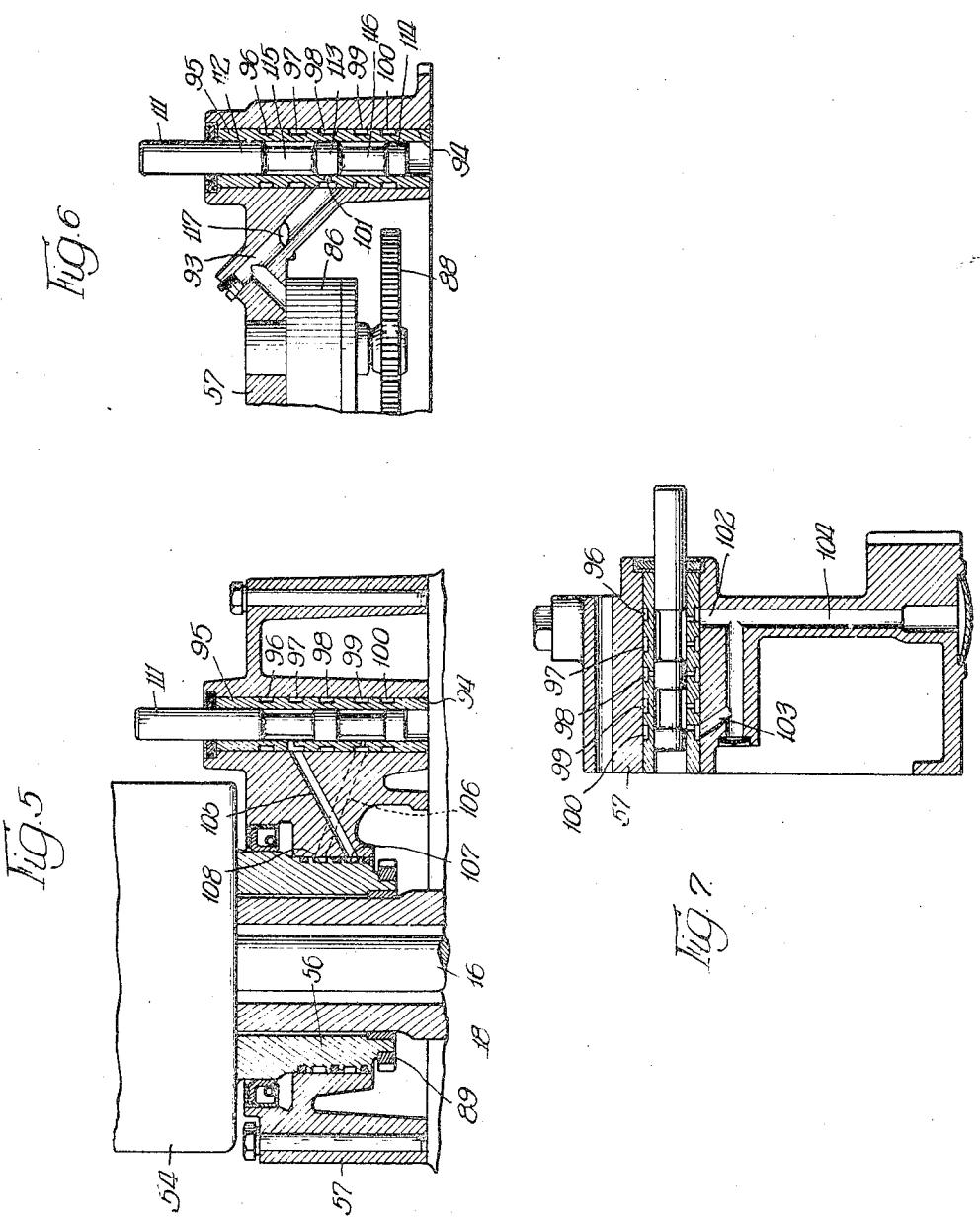

Oct. 25, 1949.     O. H. BANKER     2,485,688
AXIALLY ENGAGING MULTIPLE FLUID CLUTCH
Filed Dec. 26, 1944     6 Sheets-Sheet 6
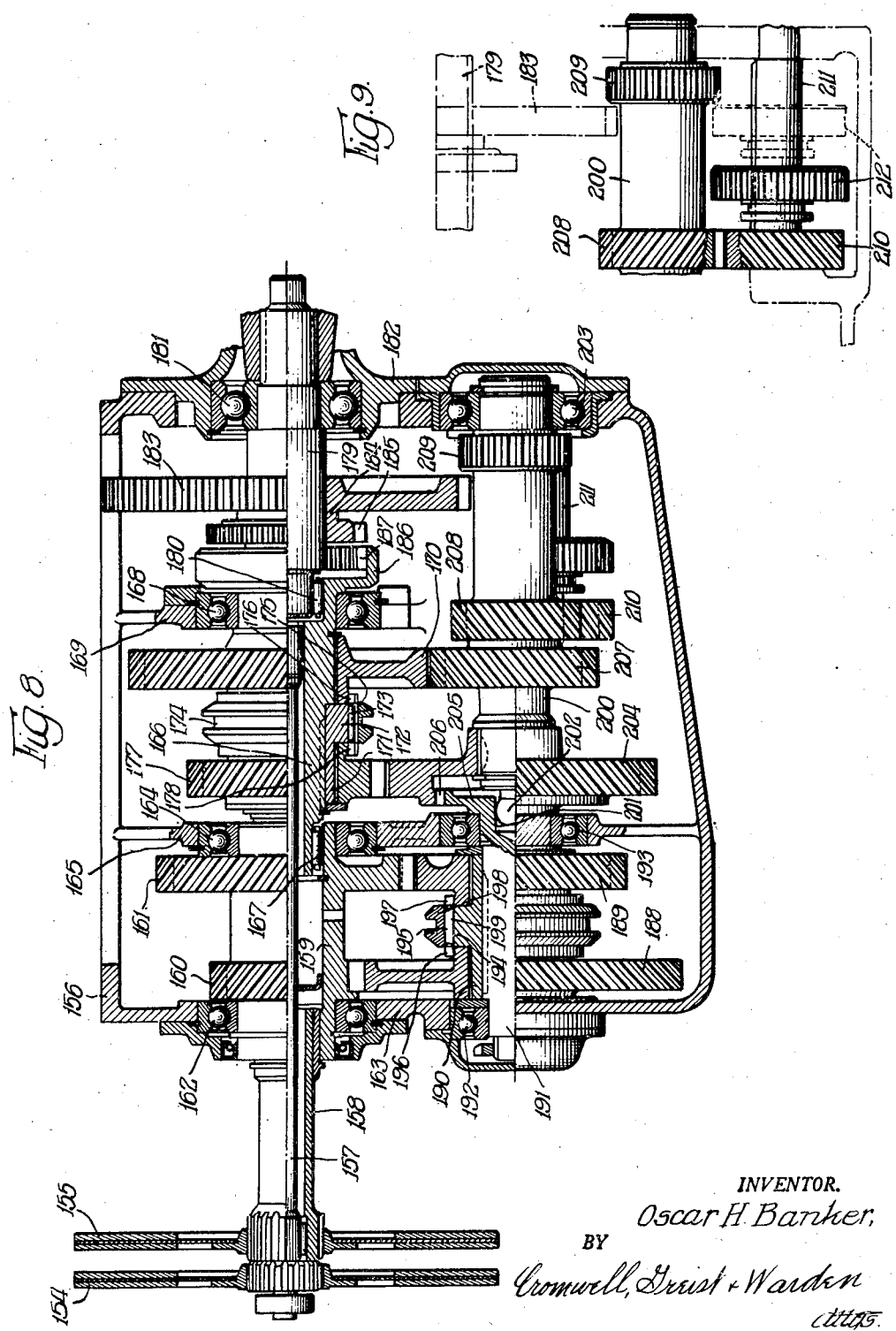
INVENTOR.
Oscar H. Banker,
BY
Cromwell, Greist & Warden
ATTYS.

Patented Oct. 25, 1949

2,485,688

UNITED STATES PATENT OFFICE 2,485,688

AXIALLY ENGAGING MULTIPLE FLUID CLUTCH

Oscar H. Banker, Evanston, Ill., assignor to New Products Corporation, Chicago, Ill., a corporation of Delaware Application December 26, 1944, Serial No. 569,848

18 Claims. (Cl. 192—87)

This invention has to do with automotive transmissions.

One object of the invention is to provide an improved hydraulic clutch control by means of which either one of two clutches in a dual clutch transmission can be quickly operated in a simple and highly effective manner.

Another object is to provide an improved transmission in which shifting from one gear ratio to another can be accomplished without appreciable interruption in the delivery of torque by the transmission.

Another object is to provide an improved transmission which is particularly well suited for heavy bulldozing work and can be operated rapidly back and forth between a very low or crawler forward gear ratio and a relatively fast reverse gear ratio with but a simple clutch manipulation and without any shifting of gears.

Other more specific objects and advantages of the invention will be apparent to those skilled in the art upon a full understanding of the construction, arrangement and operation of the new transmission.

While the hydraulic clutch control features of the invention are especially applicable to dual clutches, certain of such features can be incorporated advantageously in single clutch transmissions and other mechanisms.

Two embodiments of the invention are presented herein by way of explanation but it will of course be appreciated that the invention is susceptible of incorporation in other structurally modified forms coming equally within the scope of the appended claims.

In the accompanying drawings,

Fig. 4 is another vertical transverse section, taken on line 4—4 of Fig. 1;

Fig. 5 is a fragmentary section, taken on the line 5—5 of Fig. 4;

Fig. 6 is a fragmentary section, taken on the line 6—6 of Fig. 4;

Fig. 7 is a fragmentary section taken on the line 7—7 of Fig. 4;

Fig. 8 is a vertical longitudinal section through another form of transmission equipped with the hydraulic clutch control; and Fig. 9 is a fragmentary view of the rear section of the jack shaft in this transmission showing the reversing shaft which is located at one side of the jack shaft.

The control means which forms the subject matter of the present invention is shown in Figs. 1 to 7, inclusive, of the drawings applied to the front unit 10 (Fig. 1) of a variable speed transmission. This transmission includes, in addition to the front unit 10, a rear unit 11 (Fig. 2) which operates in conjunction with the front unit to provide four speeds in forward and two in reverse.

Figure 1:
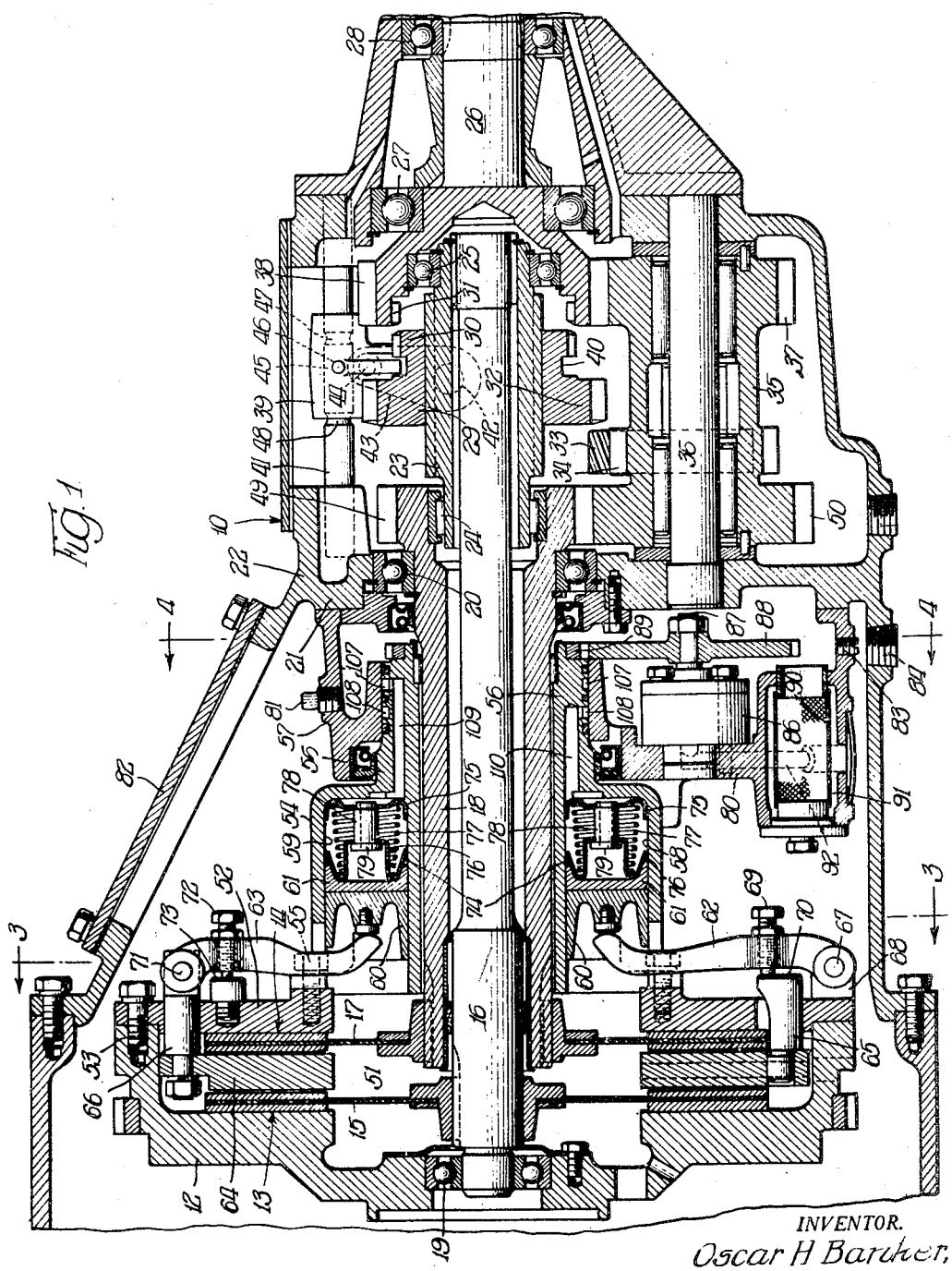
Fig. 1 is a vertical longitudinal section through a hydraulic clutch control constructed in accordance with the invention, showing the control applied to the front unit of a two-unit transmission, the section through the hydraulic control being taken on the line 1—1 of Fig. 3.

The front unit 10 is adapted to be connected with the flywheel 12 of an associated motor through either one of two hydraulically operated friction clutches 13 and 14 (Fig. 1).

The clutch 13 includes a driven clutch plate 15 which is splined on the front end of a shaft 16, while the clutch 14 includes a driven clutch plate 17 which is splined on the front end of a shaft 18. The driven plates 15 and 17 may be of any suitable construction. The shaft 16 on which the driven plate 15 is mounted is positioned in axial alignment with the flywheel 12 and is journaled at its front end in a bearing 19 carried by the flywheel. The shaft 18 on which the driven plate 17 is mounted is tubular in form and is sleeved over the shaft 16. The rear end of the shaft 18 is journaled in a bearing 20 which is mounted in a vertical partition 21. The partition 21 is located in a casing 22 and extends transversely of the latter. The clutches 13 and 14 and the hereinafter described means for controlling the operation of the same are housed in the casing 22 in front of the partition 21, while the gearing which constitutes the front unit 10 of the transmission and the hereinafter described means for shifting the same are housed in the casing 22 behind the partition 21.

A sleeve 23 is fixedly secured to the rear end of the shaft 16. The front end of the sleeve 23 is journaled in a bearing 24 which is mounted in a recess in the rear end of the shaft 18, while the rear end of the sleeve 23 is journaled in a bearing 25 which is mounted in a recess in the front end of a rearwardly extending shaft 26. The shaft 26 is journaled in the casing 22 in bearings 27 and 28, in axial alignment with the telescopically associated shafts 16 and 18.

An axially shiftable collar 29 is splined on the sleeve 23 and is provided at its rear end with a small jaw clutch 30. When the collar 29 is shifted rearwardly the clutch 30 is adapted to clutch non-rotatably within a complementary internal clutch 31 formed on the front end of the shaft 26. The collar 29 is also provided at its front end with a relatively large gear 32. When the collar 29 is shifted forwardly the gear 32 is adapted to mesh with a reversing gear 33, which reversing gear is mounted on a shaft (not shown) and is arranged in constant mesh with a gear 34 formed on an elongated hub 35. The hub 35 is journaled on a shaft 36 which is fixedly mounted at its front end in the partition 21 and at its rear end in the rear wall of the casing 22. The hub 35 is provided at its rear end with a second gear 37 which meshes with a gear 38 formed on the front end of the shaft 26.

From the foregoing it will be understood that when the collar 29 is shifted rearwardly from its neutral position (shown in Fig. 1) it will connect the shaft 16 directly with the shaft 26 through the clutch-like coupling 30—31, and that when the collar 29 is shifted forwardly from its neutral position it will connect said shafts together in reverse under a multiplication of torque through the gears 32, 33, 34, 37 and 38.

The collar 29 is adapted to be shifted either forwardly or rearwardly from its neutral position by means of a shifting yoke 39. The yoke 39 engages within a groove 40 in the collar 29 and is slidably mounted on a rod 41 located within the casing 22. The yoke is shifted from a point exteriorly of the casing by a transversely disposed rock shaft 42, which shaft is provided on the inside of the casing with a short lever arm 43 which is pivotally connected at its free upper end with the yoke 39 by a pin 44. The yoke 39 is yieldably indexed in its neutral, reverse and forward positions by a spring pressed detent 45 which is carried by the yoke and engages within annular positioning grooves 46, 47 and 48 formed in the surface of the rod 41.

The tubular shaft 18 is provided at its rear end with a gear 49 which meshes with a gear 50 formed on the front end of the previously mentioned hub 35. This connection enables the shaft 18 to drive the shaft 26 in a forward direction through the low gear ratio provided by the gears 49, 50, 37 and 38.

The driven clutch plates 15 and 17 of the clutches 13 and 14 are located in a circular recess 51 which is formed in the rear face of the flywheel 12. The recess 51 is closed at its rear end by a centrally apertured cover plate 52 which is secured by screws 53 to the outer periphery of the flywheel. An annular casing 54 is secured by screws 55 to the inner periphery of the cover plate 52 and extends rearwardly about the shaft 18 to a point adjacent the partition 21. The rear end 56 of the casing 54 is reduced in diameter and fits snugly but rotatably within a second stationary casing 57 which is secured at its rear end to the partition 21.

The casing 54 contains two sets of forwardly opening hydraulic cylinders, which cylinders are of substantial axial length and are arranged in a circle in equally spaced relation to each other. The cylinders are divided into two sets, preferably of three cylinders each, with the cylinders 58 in one set alternating with the cylinders 59 in the other set. The cylinders 58 and 59 contain closely fitting pistons 60 which are provided with cup-shaped packings 61. The pistons in the cylinders 58 engage with the inner ends of levers 62 which operate the clutch 13, while the pistons in the cylinders 59 engage with the inner ends of levers 63 which operate the clutch 14. In the neutral position of the dual clutch mechanism (see Fig. 1) all of the pistons 60 are disposed at approximately their half-way points in the cylinders 58 and 59.

The levers 62 and 63, which extend into the front ends of the cylinders through slots in the outer sides of the latter, operate the clutches 13 and 14 through an annular pressure plate 64, which pressure plate is located between the clutch plates 15 and 17 in the recess 51 in the flywheel 12. The pressure plate 64 is shiftable axially but is held against rotation relative to the flywheel by two sets of studs 65 and 66 on the outer periphery of the pressure plate, which studs project rearwardly through circumferentially interlocking apertures in the cover plate 52. The studs 65 in one of the sets coact with the levers 62, while the sets 66 in the other set coact with the levers 63. In the neutral position of the dual clutch mechanism the pressure plate 64 is maintained free from frictional engagement with both of the clutch plates 15 and 17 by the hereinafter described equalizing means.

The outer ends of the levers 62 are pivotally connected at 67 to lugs 68 on the outer periphery of the cover plate 52. Inwardly of their outer ends the levers 62 are provided with adjustable set screws 69 which engaged with the rear ends 70 of the studs 65. The outer ends of the levers 63 are pivotally connected at 71 to the rear ends of the studs 66. Inwardly of their ends the levers 63 are provided with adjustable set screws 72 which engage with bosses 73 positioned on the rear face of the cover plate 52.

It will be understood from this construction that when the hydraulic fluid used to operate clutches 13 and 14 is fed under pressure into the cylinders 58, with a simultaneous release of the pressure on the fluid in the cylinders 59, the lever 62 will be moved by the pistons in the cylinders 58, and, fulcruming on the lugs 68, will act through the set screws 69 and studs 65 to shift the pressure plate 64 forwardly, causing the driven plate 15 to be clutched frictionally between the rear face of the flywheel and the front face of the pressure plate. In similar manner, when the fluid is fed under pressure into the cylinders 59, with a simultaneous release of the pressure on the fluid in the cylinders 58, the levers 63 will be moved by the pistons in the cylinders 59 and, fulcruming on the bosses 73, will act through the studs 66 to shift the pressure plate 64 rearwardly, causing the driven plate 17 to be clutched frictionally between the rear face of the pressure plate and the front face of the cover plate. As the pistons in the cylinders 58 move in one direction the pistons in the cylinders 59 will of course move in the opposite direction, simultaneously and to the same extent.

The cylinders 58 and 59 are provided behind the packings 61 with resiliently compressible equalizers 74 which occupy the fluid spaces in the cylinders. These equalizers consist of thin sheet metal disks 75 which bear against the rear ends of the cylinders and other thin sheet metal disks 76 which bear against the packings. Coil springs 77 are positioned under compression between the disks 75 and 76. The disks 75 are provided with studs 78 which project forwardly through apertures in the disks 76 and terminate in enlarged heads 79, which heads uniformly limit the extent to which the springs 77 can force the disks apart. The disks 76 are rearwardly recessed about the apertures in the same, whereby to provide working space for the studs 78 when the disks 76 are pressed rearwardly by the packings toward the disks 75.

The equalizers 74 serve to so position all of the pistons 60 in the cylinders as to return the pressure plate 64 to its neutral position free from clutched engagement with either the driven plate 15 or the driven plate 17 and maintain it in its neutral position when the flow of fluid to either set of cylinders is discontinued. The resistance of the equalizers 74 to compression is not sufficient, however, to interfere in any way with the normal operation of the pistons in the cylinders.

The fluid used for moving the pistons in the cylinders 58 and 59 is preferably a high grade oil of the type ordinarily used in hydraulic systems. This fluid is located in a downwardly extending portion 80 of the previously mentioned casing 57, between the front wall of the latter and the partition 21. The fluid may be introduced by removing a screw plug 81 in the top of the casing 57, after first removing a cover plate 82 on the top of the main casing 22, and may be drained by removing another screw plug 83 in the bottom of the lower portion 80 of the casing 57, after first removing an underlying screw plug 84 in the bottom of the main casing 22. The level of the fluid may be checked by a blade type gauge 85 (Fig. 4) which extends through both casings into the sump.

The lower portion 80 of the casing 57 contains a rotary pump 86 which is secured to the inside of the front wall of the casing and is provided with a rearwardly extending drive shaft 87 on which a gear 88 is mounted. The gear 88 meshes upwardly with and is driven by a ring gear 89 mounted on the reduced rear end 56 of the previously mentioned casing 54, which casing rotates as a unit with the flywheel 12.

The fluid in the lower portion 80 of the casing 57 enters the rear open end of a tubular filter 90, passes radially outward through the filter into a surrounding annular chamber 91, and is drawn upwardly into the pump 86 through a passage 92 communicating with said chamber 91 at one side of the filter. From the pump 86 the fluid is fed under pressure through a passage 93 (see Figs. 4 and 6) into a bore 94 of a control valve at one side of the pump. An exteriorly grooved sleeve 95 is fitted within the bore 94. The sleeve 95 contains five annular grooves 96, 97, 98, 99 and 100, and these grooves are provided with circumferentially spaced openings 101 which lead from the grooves into the bore forming the inside of the sleeve.

The pressure passage 93 from the pump 86 opens into the center groove 98 in the sleeve 95. The two end grooves 96 and 100 are discharge grooves and communicate respectively with branch passages 102 and 103 (see Fig. 7) which converge into a common discharge passage 104 leading back to the sump. Passage 104, it will be noted, discharges into the chamber 91 externally of the filter 90 (see Fig. 4), thereby insuring that only clean filtered liquid will be pumped to and discharged from clutch control pressure cylinders 58, 59.

It will be appreciated that when the plungers 61 of one of the sets of cylinders 58 are actuated to apply one of the clutches, the plungers of the other set of cylinders 59 are driven rearwardly, thus expelling pressure liquid back to the chamber 91. When the equalizers return these plungers to neutral position, they create a suction in the line to said chamber 91, tending to draw liquid into the respective cylinders. By providing that the liquid line opens to chamber 91 on the exterior of filter 90, I insure that only clean, sludge-free liquid can possibly be thus drawn back into any of the cylinders 58 or 59.

Furthermore, inasmuch as the volume of liquid quickly discharged from cylinders 58, 59 to the chamber 91 is greater than the volumetric capacity of pump 86 which is supplied from said chamber, the result is that the excess liquid is forced radially inward through the filter. This reverse flow performs a cleaning or backwashing action on the screw, thereby prolonging the life of the filter by preventing clogging thereof. The two intermediate grooves 97 and 99 communicate respectively with passages 105 and 106 (see Fig. 5), which passages in turn communicate respectively with two annular grooves 107 and 108 formed in the cylindrical outer surface of the reduced end 56 of the casing 54. The groove 107 opens inwardly into three longitudinally extending passages 109 which lead to the cylinders 59, and the groove 108 opens inwardly into three other longitudinally extending passages 110 which lead to the cylinders 58.

The sleeve 95 contains an axially shiftable valve plunger 111 which fits within the sleeve in fluid-tight engagement with the same. The plunger 111 is provided with three full diameter sections 112, 113 and 114, and with two intervening reduced diameter sections 115 and 116. The reduced sections 115 and 116 of the plunger serve to establish various hereinafter described connections between the grooves in the sleeve 95.

When the valve plunger 111 is in its neutral position (as in Figs. 5, 6 and 7) the pressure groove 98 communicating with the pressure passage 93 leading from the pump 86 will be blocked off by the center section 113 of the plunger and the flow of fluid delivered by the pump will be by-passed back to the supply through a side passage 117 controlled by an adjustable relief valve 118 located at the end of that passage. In this position of the plunger 111 the grooves 97 and 99 communicating with the passages 105 and 106 leading to the cylinders 58 and 59 are placed in communication with the discharge grooves 96 and 100. When the plunger 111 is shifted forwardly from its neutral position the pressure groove 98 will be placed in communication with the groove 99 connected with the three cylinders 58 and the groove 97 connected with the three cylinders 59 will be placed in communication with the discharge groove 96. Similarly, when the plunger 111 is shifted rearwardly from its neutral position the pressure groove 98 will be placed in communication with the groove 97 connected with the cylinders 59 and the groove 99 connected with the cylinders 58 will be placed in communication with the discharge groove 100.

The plunger 111 is shifted axially from a point exteriorly of the casing 22 by a lever 119 (see Fig. 4) which is secured to a short rock shaft 120 journaled in the side of the casing. The shaft 120 is connected at its inner end to a bell crank lever 121. One arm 122 of the lever 121 is coupled to the front end of the plunger 111, while the other arm 123 of the lever is provided with an arcuate end portion 124. The end portion 124 contains three arcuately arranged indexing recesses (not shown) with which an adjustably spring pressed plunger (not shown) in an exteriorly accessible housing 125 coacts to locate the plunger accurately in each of its three different control positions.

Figure 2:
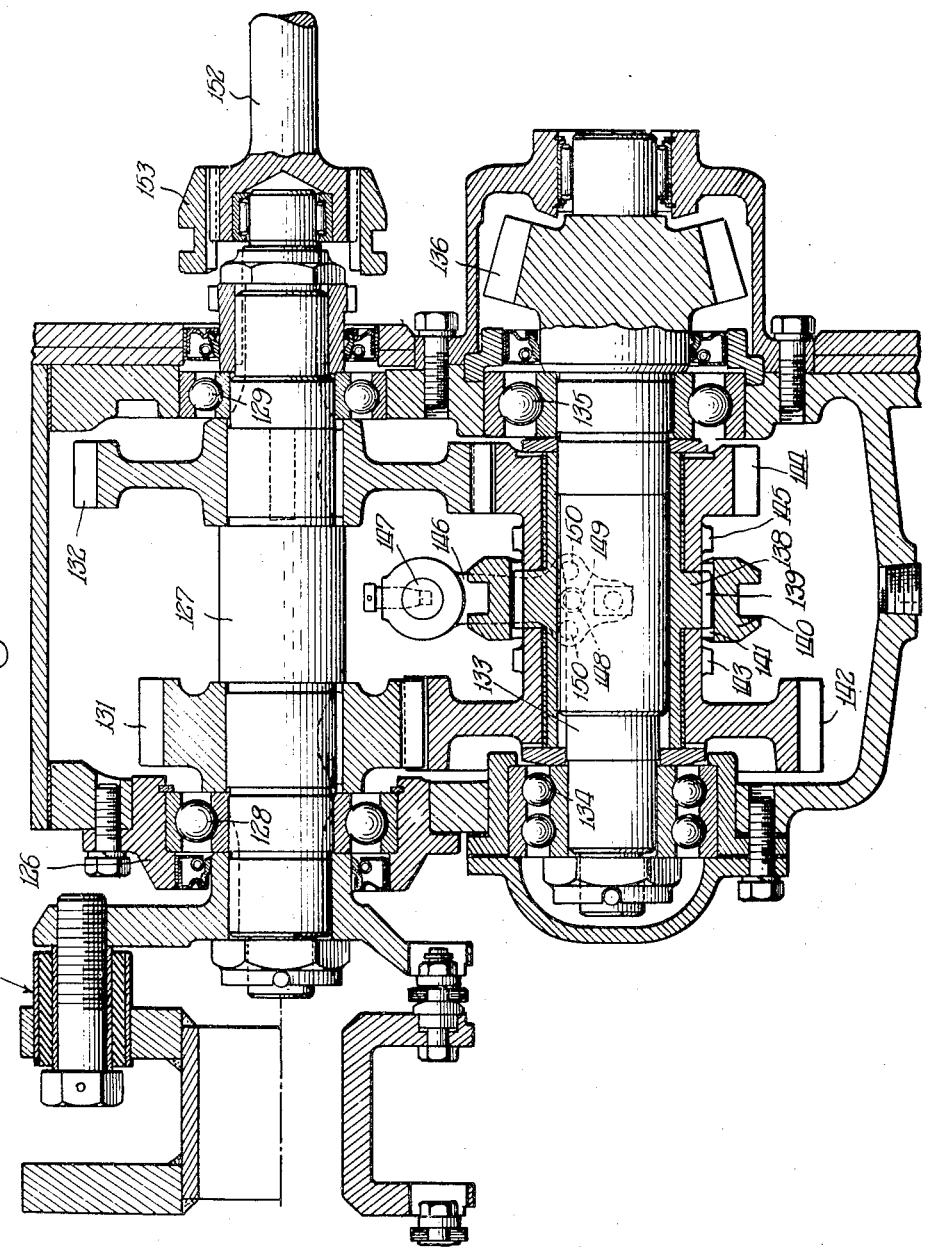
Fig. 2 is a vertical longitudinal section through the rear unit of the two-unit transmission.
Figure 3:
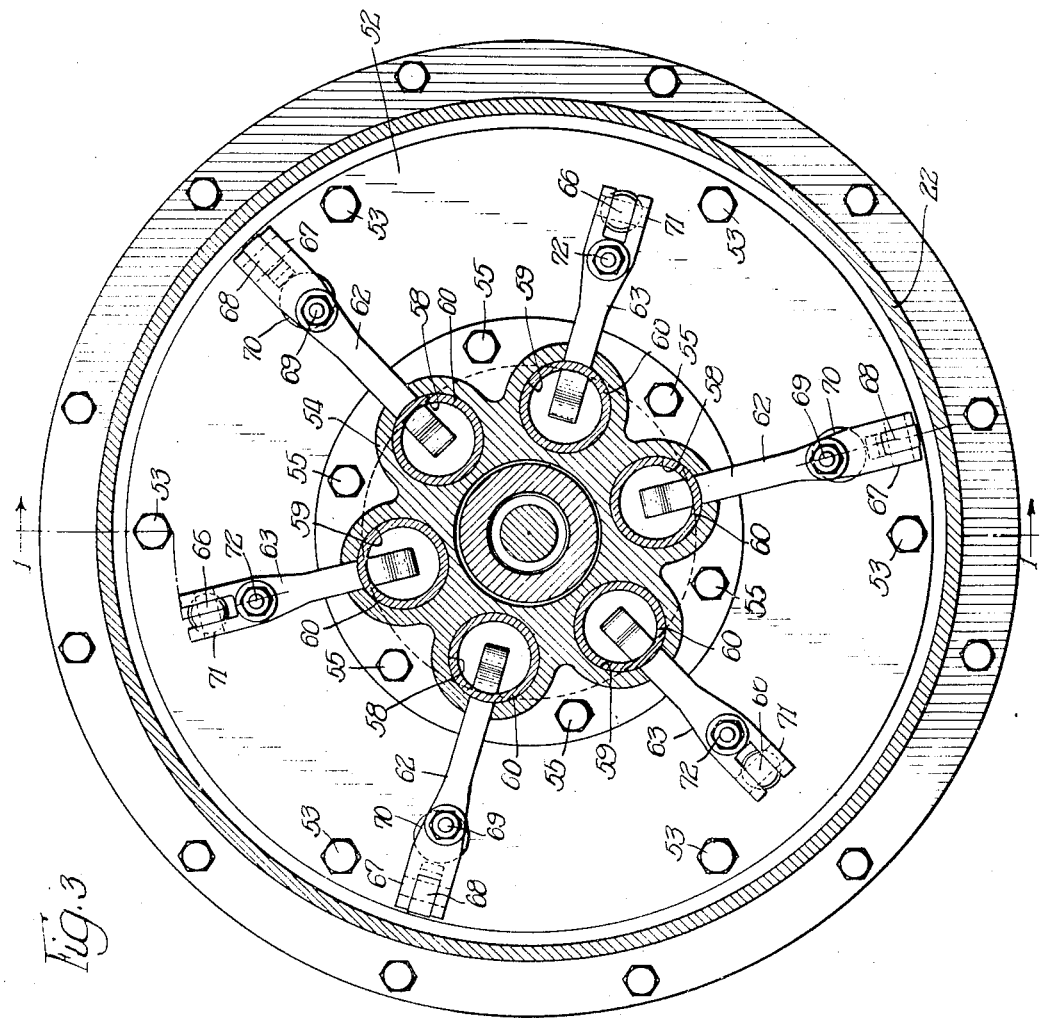
Fig. 3 is a vertical transverse section through the hydraulic control, taken on the line 3—3 of Fig. 1.

Passing to the rear unit 11 of the transmission—which unit may be used in conjunction with the front unit 10—this unit is mounted in a separate casing 126 (see Fig. 2). It includes an upper shaft 127 which is journaled adjacent its front end in a bearing 128 and adjacent its rear end in a bearing 129. The shaft 127 is arranged in axial alignment with the output shaft 26 of the front unit 10 and is connected directly with the latter, preferably by a flexible coupling 130. A small gear 131 is secured to the front portion of the shaft 127, and a relatively large gear 132 is secured to the rear portion of the shaft 127.

Another shaft 133 is located in the casing 126, below and parallel to the shaft 127. This lower shaft is journaled at its front end in a bearing 134 and is journaled adjacent its rear end in a bearing 135. The rear end of the shaft 133 is provided with a beveled pinion 136 which meshes laterally with a relatively large bevel gear (not shown) connected with the load. A sleeve 137 is secured to the shaft 133 and is provided intermediate its ends with an annular enlargement 138 having radially projecting clutch teeth 139. A collar 140 having complementary clutch teeth 141 on its inner periphery is mounted on the enlargement 138 for axially shiftable but non-rotatable engagement with the same.

A relatively large gear 142 is journaled on the front portion of the sleeve 137, in mesh with the gear 131 on the shaft 127. The gear 142 is provided adjacent the enlargement 138 with radially projecting clutch teeth 143 of the same size and spacing as the teeth 139 on the sleeve 137. When the collar 140 is shifted forwardly from its neutral positon (shown in Fig. 2) the teeth 141 on the inside of the collar will bridge the teeth 139 and 143 and will clutch the gear 142 to the shaft 133.

A second relatively small gear 144 is journaled on the rear portion of the sleeve 137 in mesh with the gear 132 on the shaft 127. The gear 144 is also provided with radially projecting clutch teeth 145. When the collar 140 is shifted rearwardly from its neutral position the teeth 141 will bridge the teeth 139 and 145 and will clutch the gear 144 to the shaft 133.

The collar 140 can be shifted axially from its neutral position into either its forward position or its rearward position by a swinging yoke 146 which is secured to a rock shaft 147 journaled in one side of the casing 126. The shaft 147 extends to the outside of the casing and is provided there with an operating lever (not shown). The yoke 146 is indexed in each of its three different operating positions by means of an exteriorly accessible spring pressed plunger 148 which is mounted in the casing and projects inwardly into resiliently yieldable engagement with centering recesses 149, 150 and 151 formed in an opposing portion of the yoke 146.

The upper shaft 127 may be provided, if desired, with a power take-off shaft 152. This shaft, which may be used for any purpose desired, is releasably connected with the rear end of the shaft 127 by an axially shiftable clutch collar assembly 153.

The hydraulic dual clutch assembly of the present invention, employing a single automatically centralized pressure plate for both clutches, actuated by two oppositely moving sets of pistons, and controlled by a single fluid directing valve, is a substantial improvement over any of the dual clutch arrangements heretofore employed, not only in its simplicity and compactness, but in its ease and speed of operation, and in its dependability under all conditions.

It permits the associated transmission to be shifted instantly from one gear to another, without loss of torque. For bulldozing work, for which the dual clutch control is well suited, the gear ratios in the transmission are preferably so constructed as to give a faster speed in reverse than in low-low forward. When the collar 29 is moved forwardly into its reversing position actuation of the clutch 14 will drive the transmission forwardly at a very slow crawler speed under a high multiplication of torque, and actuation of the clutch 13 will drive the transmission rearwardly at a relatively fast speed. This enables the operator, by merely alternating the position of the control valve, to make short quickly repeated advances against the material or obstruction being worked on.

It will be noted that the various shafts in the transmission are so mounted in their bearings as to effect a floating arrangement of the same. This arrangement in large measure eliminates strains within the transmission resulting from loading and heating, facilitates assembling and disassembling, and reduces production costs. The shaft 16 is supported at its rear end in the sleeve 23, while the telescopically associated tubular shaft 18 supports the front end of the sleeve 23 and is in turn supported in the vertical partition 21 of the casing. Of the two bearings supporting each shaft, one is fixed against axial movement while the other is capable of some axial movement, whereby to compensate for endwise expansion and contraction of the shafts. For the shaft 16, for instance, the bearing 25 is fixed while the bearing 19 is shiftable axially relative to the shaft; for the shaft 18, the bearing 20 is fixed while the bearing 24 is shiftable; and for the shaft 26, the bearing 27 is fixed while the bearing 28 is shiftable. The same is true of the shafts in the rear unit 11, the bearings 128 and 134 being fixed and the bearings 129 and 135 being shiftable in their mountings.

The two unit transmission will give four speeds in forward and two in reverse. The lowest forward gear ratio will be obtained by letting in clutch 14, with the shifting collar 29 in its rearwardly clutched position and the shifting collar 140 in its forwardly clutched position. Second is immediately obtained by letting in clutch 13, with collar 29 still in its rearwardly clutched position. Third is then obtained by momentarily neutralizing clutch 13, shifting collar 140 into its rearwardly clutched position, and letting in clutch 14. Fourth is then obtained by letting in clutch 13. It will of course be understood that any suitable gear shifting linkage can be connected up with the shifting devices 39 and 146 under the control of a single lever to properly coordinate the operation of those devices.

In Figs. 8 and 9 a modified single unit multiple speed transmission of novel construction is shown. This transmission is equipped with hydraulically operated dual clutch control of the same construction as that illustrated in Figs. 1 to 7, inclusive. Only the clutch driven plates 154 and 155 of the two clutches are shown in connection with this structure, the other parts being omitted for clearness. This modified transmission is housed within a casing 156. The driven plate 154 is shiftably splined to the front end of a shaft 157, while the driven plate 155 is shiftably splined to the front end of a tubular shaft 158 which surrounds the shaft 157.

The tubular shaft 158 extends rearwardly into a second tubular shaft 159 and is fixedly splined to that shaft. The shaft 159 is provided adjacent its front end with a small integral gear 160 and is provided adjacent its rear end with a relatively large integral gear 161. The front end of the shaft 159 is journaled in a bearing 162 which is mounted in the front wall 163 of the casing 156, while the rear end of the shaft 159 is journaled in a bearing 164 which is mounted in a vertical web 165 formed in the casing.

A third tubular shaft 166 extends rearwardly from the shaft 159. The front end of the shaft 166 is journaled in a bearing 167 which is mounted in the hollow rear end of the shaft 159, while the rear end of the shaft 166 is journaled in a bearing 168 which is mounted in another vertical web 169. The shaft 157 terminates in the shaft 166 adjacent the rear end of the latter and is fixedly splined to the same. A large gear 170 of somewhat larger size than the gear 161 is journaled on the shaft 166 near the rear end of the latter, and a sleeve 171 is keyed to the shaft 166 in front of the gear 170. The sleeve 171 is provided with an annular enlargement 172 having radially projecting clutch teeth 173. An axially shiftable clutch collar 174 having complementary teeth 175 on its inner periphery is sleeved over the enlargement 172 in circumferentially interlocked engagement with the latter. The gear 170 is provided adjacent the enlargement 172 with radially projecting teeth 176 of the same size and spacing as the teeth 173 on the enlargement. When the clutch collar 174 is shifted rearwardly from its neutral position (shown in Fig. 8) the teeth 175 on the inside of the same will bridge the teeth 173 and 176, clutching the gear 170 to the shaft 166. A relatively small gear 177 of somewhat larger size than the gear 160 is journaled on the sleeve 171 in front of the enlargement 172 and is provided adjacent the enlargement with radially projecting teeth 178 of the same size and spacing as the teeth 173 and 176. When the clutch collor 174 is shifted forwardly from its neutral position the teeth 175 on the inside of the same will bridge the teeth 173 and 178, clutching the gear 177 to the shaft 166.

A shaft 179—which constitutes the output shaft of the transmission—extends rearwardly from the third tubular shaft 166. The front end of the shaft 179 is journaled in a bearing 180 which is mounted in the hollow rear end of the shaft 166, while the rear end of the shaft 179 is journaled in a bearing 181 which is mounted in the rear wall 182 of the casing. A large gear 183 is shiftably splined on the shaft 179 and is provided with a forwardly extending hub 184 having radially projecting clutch teeth 185. The hollow rear end of the shaft 166 is enlarged and formed into a rearwardly extending annular flange 186. The flange 186 is provided on its inner periphery with clutch teeth 187 which are complementary to the clutch teeth 185 on the hub 184 of the gear 183. When the gear 183 is shifted forwardly along the shaft 179 the teeth 185 will interlock circumferentially with the teeth 187, clutching the shaft 179 directly to the shaft 166.

The two gears 160 and 161 on the tubular shaft 159 mesh respectively with two gears 188 and 189 which are journaled below the gears 160 and 161 on a sleeve 190. The sleeve 190 is fixedly splined to a jack shaft 191. The front end of the shaft 191 is journaled in a bearing 192 which is mounted in the lower portion of the front wall 163 of the casing, while the rear end of the shaft 191 is journaled in a bearing 193 which is mounted in the lower portion of the vertical web 165.

The sleeve 190 is provided intermediate the gears 188 and 189 with an annular enlargement 194 having radially projecting clutch teeth 195, and the hubs of the gears 188 and 189 are provided with similar clutch teeth 196 and 197. An axially shiftable clutch collar 198 having complementary teeth 199 on its inner periphery is sleeved over the enlargement 194 in circumferentially interlocked engagement with the latter. When shifted forwardly from its neutral position the collar 198 clutches the gear 188 to the shaft 191, and when shifted rearwardly from its neutral position it clutches the gear 189 to the shaft 191.

A second jack shaft 200 extends rearwardly from the shaft 191. The rear end of the shaft 191 contains a pilot recess 201 and the front end of the shaft 200 is provided with a ball tip 202 which is supported in the recess 201. The rear end of the shaft 200 is journaled in a bearing 203 which is mounted in the lower portion of the rear wall 182 of the casing. The gear 177 meshes downwardly with a gear 204 which is keyed to the shaft 200. The gear 204 is also connected with a radial flange 205 on the rear end of the shaft 191 by means of an axially separable but circumferentially interlocking spline connection 206.

The shaft 200 is provided with three integrally formed gears 207, 208 and 209 of progressively smaller size. The gear 170 meshes downwardly with the gear 207. The gear 209 meshes upwardly with the gear 183 when the latter is shifted rearwardly into the plane of the gear 209. The gear 208 meshes laterally with a reversing gear 210 (see Fig. 9) which is secured to the front end of a short countershaft 211. The shaft 211 is journaled in the casing at one side of the shaft 200. A gear 212 is shiftably splined on the shaft 211. When the gear 212 is shifted rearwardly into the plane of the gear 183, in the forwardly disconnected position of the latter, it will mesh with the gear 183 and establish a reverse drive between the shaft 200 and the shaft 179.

As in the transmission first described, the bearings in which the various shafts are mounted are so constructed and arranged as to compensate effectively for the endwise expansion and contraction occasioned by heating and load transmitting conditions. The shafts 157 and 158 are floatingly mounted relative to each other. The inner bearing 180 for the rear end of the sleeve 166 in which the shaft 157 is splined is shiftable axially between the sleeve and the shaft 179, and the inner bearing 167 for the rear end of the sleeve 159 in which the shaft 158 is secured is likewise shiftable axially between that sleeve and the sleeve 166. The end bearings 162 and 181 are fixed in the casing, while the intermediate bearings 164 and 168, although fixed with respect to the casing are shiftable with respect to the sleeves 159 and 166. The same is true of the bearings for the lower shaft sections 191 and 200. The bearing 192 for the front section 191 is fixed while the bearing 193 for that section is shiftable relative to the casing. Likewise, the bearing 203 for the rear section 200 is fixed while the pilot bearing 202 is shiftable.

The universal drive connection effected between the two sections 191 and 200 by the introduction of the pilot bearing 202 and the separable clutch 206 permits of the intermediate bearing support 193 without setting up any bearing stresses and greatly facilitates manufacture and assembly.

I claim:

1. In a hydraulically operated dual clutch control for a multiple speed transmission, two selectively operable friction clutches characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, and valve controlled means for delivering fluid under pressure to said cylinders to operate either the pistons associated with one clutch or the pistons associated with the other clutch.

2. In a hydraulically operated dual clutch control for a multiple speed transmission, two selectively operable friction clutches characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, valve controlled means for delivering fluid under pressure to said cylinders to operate either the pistons associated with one clutch or the pistons associated with the other clutch, and resiliently expansible means within the cylinders for uniformly positioning the pistons therein when the delivery of fluid under pressure is cut off, whereby to maintain both clutches in their neutral positions.

3. In a hydraulically operated dual clutch control for a multiple speed transmission, two selectively operable clutches characterized by an interposed torque transmitting member which is common to both clutches, a plurality of hydraulic cylinders containing movable pistons, one of said pistons being operably connected with said member to move the same axially in one direction to engage one of the clutches, and another being operably connected with said member to move the same axially in the opposite direction through a neutral position to engage the other clutch, and valve controlled means for delivering fluid under pressure to said cylinders to operate either the piston associated with one clutch or the piston associated with the other clutch.

4. In a hydraulically operated dual clutch control for a multiple speed transmission, two selectively operable clutches characterized by an interposed torque transmitting member which is common to both clutches, a plurality of hydraulic cylinders containing movable pistons, one of said pistons being operably connected with said member to move the same axially in one direction to engage one of the clutches, and another being operably connected with said member to move the same axially in the opposite direction through a neutral position to engage the other clutch, valve controlled means for delivering fluid under pressure to said cylinders to operate either the piston associated with one clutch or the piston associated with the other clutch, and means for returning said member to a neutral position free from engagement with both clutches when the delivery of fluid under pressure is cut off.

5. In a hydraulically operated dual clutch control for a multiple speed transmission, two selectively operable clutches characterized by an interposed torque transmitting member which is common to both clutches, a plurality of hydraulic cylinders containing movable pistons, one of said pistons being operably connected with said member to move the same axially in one direction to engage one of the clutches, and another being operably connected with said member to move the same axially in the opposite direction through a neutral position to engage the other clutch, valve controlled means for delivering fluid under pressure to said cylinders to operate either the piston associated with one clutch or the piston associated with the other clutch, and means within the cylinders in engagement with the pistons for returning said member to a neutral position free from engagement with both clutches when the delivery of fluid under pressure is cut off.

6. In a hydraulically operated dual clutch control for a multiple speed transmission, two selectively operable friction clutches characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, means for delivering fluid under pressure to said cylinders to operate either the pistons associated with one clutch or the pistons associated with the other clutch, and a valve for controlling the delivery of the fluid to said cylinders.

7. In a hydraulically operated dual clutch control for a multiple speed transmission, two selectively operable friction clutches characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, means for delivering fluid under pressure to said cylinders to operate either the pistons associated with one clutch or the pistons associated with the other clutch, and a valve for controlling the delivery of the fluid to said cylinders, said valve serving to vent those cylinders in which the fluid under pressure is not being delivered, whereby to permit of the retraction of the pistons in those cylinders when the pistons in the other cylinders are moved by the fluid under pressure.

8. In a hydraulically operated dual clutch control for a multiple speed transmission, two selectively operable friction clutches, characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, means for delivering fluid under pressure to said cylinders to operate either the pistons associated with one clutch or the pistons associated with the other clutch, and a valve for controlling the delivery of the fluid to said cylinders, said valve serving to vent those cylinders in which the fluid under pressure is not being delivered, whereby to permit of the retraction of the pistons in those cylinders when the pistons in the other cylinders are moved by the fluid under pressure, and said valve serving to vent all of the cylinders when the valve is placed in its neutral position.

9. In a hydraulically operated dual clutch control for a multiple speed transmission, two selectively operable friction clutches characterized by an interposed pressure plate which is common to both clutches, a plurality of hydraulic cylinders containing axially movable pistons, certain of said pistons being operably connected with the pressure plate to move the same axially in one direction to engage one of the clutches, and the remaining pistons being operably connected with the pressure plate to move the same axially in the opposite direction through a neutral position to engage the other clutch, means for delivering fluid under pressure to said cylinders to operate either the pistons associated with one clutch or the pistons associated with the other clutch, a valve for controlling the delivery of the fluid to said cylinders, said valve serving to vent those cylinders in which the fluid under pressure is not being delivered, whereby to permit of the retraction of the pistons in those cylinders when the pistons in the other cylinders are moved by the fluid under pressure, and said valve serving to vent all of the cylinders when the valve is placed in its neutral position, and resiliently compressible open-work equalizers of uniform and predetermined expansibility located in the cylinders in contact with the pistons when the latter are in their intermediate or neutral positions, for returning the pistons to such positions and maintaining them there when the valve is placed in its neutral position.

10. In a hydraulically operated dual clutch control for a multiple speed transmission, two selectively operable friction clutches, a plurality of hydraulic cylinders containing axially movable pistons, means common to and operatively connecting certain of said pistons with one of the clutches and the remaining pistons with the other clutch, valve controlled means for delivering fluid under pressure to operate either the pistons associated with one clutch or the pistons associated with the other clutch, and means within the cylinders for uniformly positioning the pistons therein when the delivery of fluid under pressure is cut off, whereby to maintain both clutches in their neutral positions, said piston positioning means consisting of resiliently compressible devices which are equally pre-loaded in their fully expanded conditions.

11. In a fluid pressure operated dual clutch control for a multiple speed transmission, two selectively operable clutch elements, engaging means common to said clutch elements and shiftable in opposite directions for selective engagement therewith, a plurality of fluid pressure actuated members, certain of said members being operatively connected with said engaging means to shift the same in one direction and the remaining members being operatively connected therewith to shift the same in the other direction, valve controlled means for selectively delivering a fluid under pressure to said members to cause said engaging means to engage one or the other of said clutch elements, and means for predeterminedly positioning the members when the delivery of fluid under pressure is cut off, whereby to maintain said engaging means in neutral position out of engagement with said clutch elements, said positioning means comprising resiliently compressible devices acting on said pressure actuated members in a direction to oppose shifting of said engaging means by said respective members, which devices are equally pre-loaded in their fully expanded conditions.

12. In a fluid pressure operated dual clutch control for multiple speed transmission, two selectively operable clutch elements, engaging means common to said clutch elements and shiftable in opposite directions for selective engagement therewith, fluid pressure operated means operatively connected to said engaging means to shift the same selectively under fluid pressure in said directions into engagement respectively with said clutch elements, valve controlled means for controlling the delivery of a fluid under pressure to said pressure operated means to effect said selective shifting of the engaging means, and means associated with said pressure operated means for predeterminedly positioning the same when the delivery of fluid under pressure is cut off, whereby to maintain said engaging means in neutral position, said positioning means comprising resiliently compressible devices acting on said pressure operated means in a direction to oppose shifting of said engaging means in said respective directions, which devices are equally pre-loaded in fully expanded condition thereof.

13. In a control of the type described, a pair of selectively operable clutches, each including a device common to said clutches and shiftable in opposite directions for selective actuation of the respective clutches, fluid pressure actuating means for the clutches including reciprocable pistons operatively connected to said device, said pistons being movable under fluid pressure to shift the device in one direction from a neutral position into actuating position for one of the clutches, or movable under fluid pressure to shift the device in the other direction from said neutral position into actuating position for the other clutch, a source of fluid under pressure, and means for selectively controlling the application of fluid pressure from said source to said pistons to actuate the same in either direction.

14. In a control of the type described, a pair of selectively operable clutches, each including a device common to said clutches and shiftable in opposite directions for selective actuation of the respective clutches, fluid pressure actuating means for the clutches including reciprocable pistons operatively connected to said device, said pistons being movable under fluid pressure to shift the device in one direction from a neutral position into actuating position for one of the clutches, or movable under fluid pressure to shift the device in the other direction from said neutral position into actuating position for the other clutch, a source of fluid under pressure, means for selectively controlling the application of fluid pressure from said source to said pistons to actuate the same in either direction, and predeterminedly loaded spring means operatively connected to and maintaining said pistons in neutral position when fluid under pressure is not acting thereon.

15. In a control of the type described, a pair of selectively operable clutches, each including a device common to said clutches and shiftable in opposite directions for selective actuation of the respective clutches, fluid pressure actuating means for the clutches including reciprocable piston means operatively connected to said device, said piston means being actuable under fluid pressure to shift the device in one direction from a neutral position into position for actuating one of the clutches, or actuable under fluid pressure to shift the device in the other direction from said neutral position into position for actuating the other clutch, a source of fluid under pressure, and control means for said actuating means including means selectively governing the application of fluid pressure from said source to said piston means to actuate the same in either direction.

16. In a control of the type described, a pair of selectively operable clutches, each including a device common to said clutches and shiftable in opposite directions for selective actuation of the respective clutches, fluid pressure actuating means for the clutches including reciprocable piston means operatively connected to said device, said piston means being actuable under fluid pressure to shift the device in one direction from a neutral position into position for actuating one of the clutches, or actuable under fluid pressure to shift the device in the other direction from said neutral position into position for actuating the other clutch, a source of fluid under pressure, control means for said actuating means including means selectively governing the application of fluid pressure from said source to said piston means to actuate the same in either direction, and preloaded means normally maintaining said device in said neutral position when fluid under pressure is ineffective to actuate said piston means.

17. In a fluid pressure operated clutch control of the type described, a pair of selectively operable friction clutches, each including a member selectively operable to actuate said clutches, control means for said member effective to govern actuation of one or the other of said clutches thereby, including reciprocable, fluid pressure operated means operatively connected with said member, said means acting under a suction condition during a portion of a return stroke thereof, a source of fluid under pressure, and means defining feed and return passages connecting said fluid pressure operated means with said source, said source including a chamber having a filter therein adapted to strain fluid supplied to the chamber on one side of the filter and said feed and return passages opening to said chamber on the side of said filter opposite the fluid supply side.

18. In a control of the type described, a pair of selectively operable clutches, each including a device for selective actuation of the respective clutches, fluid pressure actuating means for the clutches including rotatively mounted reciprocable elements movable in opposite directions and operatively connected to said device, said elements being movable under fluid pressure to shift the device in one direction from a neutral position into actuating position for one of the clutches, or movable under fluid pressure to shift the device in the other direction from said neutral position into actuating position for the other clutch, a source of fluid under pressure, and means for selectively controlling the application of fluid pressure from said source to said elements to actuate the same in either direction.

OSCAR H. BANKER.

REFERENCES CITED

The following references are of record in the file of this patent:

UNITED STATES PATENTS

| Number | Name | Date |
|---|---|---|
| 661,070 | Olds | Nov. 6, 1900 |
| 1,011,555 | Archie | Dec. 12, 1911 |
| 2,125,433 | Dunkelow | Aug. 2, 1938 |
| 2,167,065 | Eckert | July 25, 1939 |
| 2,202,378 | Hertrick | May 28, 1940 |
| 2,286,873 | Schwartz | June 16, 1942 |
| 2,325,647 | Adamson | Aug. 3, 1943 |
| 2,341,163 | Schjolin | Feb. 8, 1944 |
| 2,342,105 | Jacobi | Feb. 22, 1944 |
| 2,376,545 | Livermore | May 22, 1945 |

OTHER REFERENCES

Ser. No. 400,817, Maybach (A. P. C.), published May 18, 1943.